Patented Dec. 5, 1950

2,532,386

UNITED STATES PATENT OFFICE 2,532,386

COLORED PHOSPHATE GLASS

William H. Armistead, Corning, N. Y., assignor to Corning Glass Works, Corning, N. Y., a corporation of New York No Drawing. Application September 27, 1949, Serial No. 118,200

8 Claims. (Cl. 106—52)

This invention relates to colored phosphate glasses having transmission characteristics making them suitable as light filters for use in photronic cells.

For such purpose a filter is desired which has a transmission vs. wave length curve similar in character to the well-known curve representing the luminous response of the human eye. No single glass containing one or more coloring oxides is known which possesses such transmission characteristics and it is therefore necessary to use in combination a plurality of glasses each having transmission characteristics matching a different portion of the curve. For the longer wave lengths a minus red filter having a certain blue green color is required. So far as is now known, the proper green color is to be obtained only by the use of CuO in a phosphate glass, that is, a glass containing a major proportion of $P_2O_5$. A silicate glass is unsuitable because CuO does not produce therein the requisite color. Accordingly one of the glasses must be a phosphate glass colored by cupric oxide.

The prior cupric oxide-containing phosphate glasses which have been used for such purpose either have been chemically unstable or have had an excessive tendency to devitrify on cooling from the molten state. Changes in composition that have been proposed for the purpose of improving chemical or physical stability have resulted in a change in color and the improved glasses, although sufficiently stable, are a yellowish green which is useless for the present purpose.

I have found that the introduction of 0.1%–3% $CeO_2$ into such a cupric oxide-colored phosphate glass overcomes this difficulty and restores the desired blue green color to the glass. This change in color is surprising when it is considered that $CeO_2$, as is well known, ordinarily imparts a yellow color to either a phosphate or a silicate glass. As a result of this invention the stability of the prior glasses may be improved without impairing the transmission characteristics thereof.

The glasses of this invention comprise essentially 45% to 80% $P_2O_5$, 8% to 25% $Al_2O_3$, 1% to 30% $SiO_2$, 0.1% to 5% CuO and 0.1% to 3% $CeO_2$, the weight percentage ratio $P_2O_5/Al_2O_3$ being between 3/1 and 6/1 and the total percentage of the essential constituents being at least 80%, subject to the following considerations:

If the $P_2O_5$ is above its maximum or if the $Al_2O_3$ is below its minimum, the chemical durability of the glass is poor.

On the other hand, the glass is difficult to melt and tends to devitrify on cooling if the $P_2O_5$ is below its minimum or if the $Al_2O_3$ is above its maximum.

Therefore, within the stated limits, when the $P_2O_5$ is high the $Al_2O_3$ also should be relatively high in order to maintain proper chemical durability and when the $P_2O_5$ is low the $Al_2O_3$ should be correspondingly low in order to provide easy melting and to avoid devitrification. Preferably the weight percentage ratio $P_2O_5/Al_2O_3$ should be 4/1 which is approximately the ratio for the stable compound $Al_2O_3.3P_2O_5$. This ratio may vary, however, between 3/1 and 6/1.

An excess of $SiO_2$ also makes the glass difficult to melt while a deficiency thereof results in devitrification.

The coloring oxides, CuO and $CeO_2$, are ineffective in amounts less than 0.1% of each and their maximum amounts need not exceed 5% and 3% respectively, larger amounts producing no useful coloring effect.

If desired, the glass may contain up to 15% of one or more of the bivalent metal oxides BeO, MgO, CaO, ZnO, SrO, CdO, BaO and PbO. More than 15% of these oxides causes devitrification or separation of insoluble phosphates. If one or more of the bivalent metal oxides are present in substantial amounts, the $SiO_2$ should be kept well below its maximum in order to avoid the possible separation of immiscible silicates.

In some instances the presence of $B_2O_3$ is desirable because of its fluxing power, but it should not exceed 15% because more than this causes devitrification.

A small amount, up to but not exceeding 5%, of one or more of the alkali metal oxides $Li_2O$, $Na_2O$ or $K_2O$, is advantageous for improving the meltability of the glass. More than 5% impairs chemical durability and creates a tendency toward devitrification.

The following compositions, calculated from their batches to the oxide basis in percent by weight, illustrate compositions falling within the scope of my invention and having spectral transmission characteristics making them suitable for the present purpose:

|                                 | 1    | 2    | 3    | 4    | 5    | 6    | 7    | 8    | 9    | 10   |
|---------------------------------|------|------|------|------|------|------|------|------|------|------|
| $P_2O_5$                        | 61.1 | 67.5 | 68.2 | 65.6 | 62.2 | 60.5 | 55.7 | 62.6 | 66.3 | 62   |
| $Al_2O_3$                       | 15.4 | 16.8 | 17.1 | 16.5 | 15.6 | 15.1 | 13.9 | 15.7 | 16.5 | 15.5 |
| $SiO_2$                         | 19.5 | 14.9 | 4.7  | 4.9  | 9.2  | 9.4  | 8.4  | 14.7 | 15   | 14.5 |
| $CuO$                           | 1    | 0.5  | 3    | 2    | 5    | 4    | 1.5  | 1    | 0.1  | 1.3  |
| $CeO_2$                         | 0.5  | 0.3  | 2    | 1    | 3    | 1    | 0.5  | 1    | 0.1  | 0.5  |
| $Na_2O$                         |      |      |      |      |      |      |      |      | 2    |      |
| $Li_2O$                         |      |      |      |      |      |      |      |      |      | 0.1  |
| $CaO$                           |      |      |      | 2.5  |      |      |      |      |      |      |
| $ZnO$                           | 2.5  |      | 5    | 2.5  |      |      | 10   |      |      | 2.5  |
| $BaO$                           |      |      |      |      | 5    |      |      |      |      | 2    |
| $PbO$                           |      |      |      |      |      |      |      | 5    |      | 1.6  |
| $B_2O_3$                        |      |      |      | 5    |      | 10   | 10   |      |      |      |

The above compositions are suitable for melting in closed pots and composition 10 is particularly useful for the purpose of the invention.

I claim:

1. A colored phosphate glass comprising essentially 45% to 80% $P_2O_5$, 8% to 25% $Al_2O_3$, 1% to 30% $SiO_2$, 0.1% to 5% CuO, and 0.1% to 3% $CeO_2$, the weight percentage ratio $P_2O_5/Al_2O_3$ being between 3/1 and 6/1 and the total percentage of the essential constituents being at least 80% of the total glass composition.

2. A colored phosphate glass comprising 45% to 80% $P_2O_5$, 8% to 25% $Al_2O_3$, 1% to 30% $SiO_2$, 0.1% to 5% CuO, 0.1% to 3% $CeO_2$, and up to 5% of at least one alkali metal oxide selected from the group consisting of $Li_2O$, $Na_2O$ and $K_2O$, the weight percentage ratio $P_2O_5/Al_2O_3$ being between 3/1 and 6/1 and the total percentage of $P_2O_5$, $Al_2O_3$, $SiO_2$, CuO and $CeO_2$ being at least 80% of the total glass composition.

3. A colored phosphate glass comprising 45% to 80% $P_2O_5$, 8% to 25% $Al_2O_3$, 1% to 30% $SiO_2$, 0.1% to 5% CuO, 0.1% to 3% $CeO_2$, and up to 15% of at least one bivalent metal oxide selected from the group consisting of BeO, MgO, CaO, ZnO, SrO, CdO, BaO and PbO, the weight percentage ratio $P_2O_5/Al_2O_3$ being between 3/1 and 6/1 and the total percentage of $P_2O_5$, $Al_2O_3$, $SiO_2$, CuO and $CeO_2$ being at least 80% of the total glass composition.

4. A colored phosphate glass comprising 45% to 80% $P_2O_5$, 8% to 25% $Al_2O_3$, 1% to 30% $SiO_2$, 0.1% to 5% CuO, 0.1% to 3% $CeO_2$, up to 5% of at least one alkali metal oxide selected from the group consisting of $Li_2O$, $Na_2O$ and $K_2O$, and up to 15% of at least one bivalent metal oxide selected from the group consisting of BeO, MgO, CaO, ZnO, SrO, CdO, BaO and PbO, the weight percentage ratio $P_2O_5/Al_2O_3$ being between 3/1 and 6/1 and the total percentage of $P_2O_5$, $Al_2O_3$, $SiO_2$, CuO and $CeO_2$ being at least 80% of the total glass composition.

5. A colored phosphate glass comprising essentially 45% to 80% $P_2O_5$, 8% to 25% $Al_2O_3$, 1% to 30% $SiO_2$, 0.1% to 5% CuO, and 0.1% to 3% $CeO_2$, and up to 15% $B_2O_3$, the weight percentage ratio $P_2O_5/Al_2O_3$ being between 3/1 and 6/1 and the total percentage of the essential constituents being at least 80% of the total glass composition.

6. A colored phosphate glass comprising 45% to 80% $P_2O_5$, 8% to 25% $Al_2O_3$, 1% to 30% $SiO_2$, 0.1% to 5% CuO, 0.1% to 3% $CeO_2$, up to 15% of at least one bivalent metal oxide selected from the group consisting of BeO, MgO, CaO, ZnO, SrO, CdO, BaO, and PbO, and up to 15% $B_2O_3$, the weight percentage ratio $P_2O_5/Al_2O_3$ being between 3/1 and 6/1 and the total percentage of $P_2O_5$, $Al_2O_3$, $SiO_2$, CuO and $CeO_2$ being at least 80% of the total glass composition.

7. A colored phosphate glass according to claim 1 in which the ratio $P_2O_5/Al_2O_3$ is about 4/1.

8. A colored phosphate glass which consists of approximately 62% $P_2O_5$, 15.5% $Al_2O_3$, 14.5% $SiO_2$, 1.3% CuO, 0.5% $CeO_2$, 0.1% $Li_2O$, 2.5% ZnO, 2% BaO, and 1.6% PbO.

WILLIAM H. ARMISTEAD.

No references cited.